(12) United States Patent
Lenihan et al.

(10) Patent No.: US 11,302,052 B2
(45) Date of Patent: Apr. 12, 2022

(54) FORCED CONTIGUOUS DATA FOR EXECUTION OF EVALUATION LOGIC USED IN ANIMATION CONTROL

(71) Applicant: Weta Digital Limited, Wllington (NZ)

(72) Inventors: Niall J. Lenihan, Wellington (NZ); Richard Chi Lei, Wellington (NZ); Sander van der Steen, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/379,992

(22) Filed: Jul. 19, 2021

(65) Prior Publication Data
US 2022/0028148 A1 Jan. 27, 2022

Related U.S. Application Data

(60) Provisional application No. 63/214,729, filed on Jun. 24, 2021, provisional application No. 63/056,454, filed on Jul. 24, 2020.

(51) Int. Cl.
| | |
|---|---|
| *G06T 13/40* | (2011.01) |
| *G06T 19/20* | (2011.01) |
| *G06T 1/60* | (2006.01) |
| *G06F 3/0484* | (2013.01) |
| *G06F 3/04842* | (2022.01) |
| *G06F 3/04845* | (2022.01) |

(52) U.S. Cl.
CPC .......... *G06T 13/40* (2013.01); *G06F 3/04842* (2013.01); *G06F 3/04845* (2013.01); *G06T 1/60* (2013.01); *G06T 19/20* (2013.01); *G06T 2213/08* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 9,489,759 B1* | 11/2016 | Gregory | G06T 13/40 |
| 10,169,903 B2* | 1/2019 | Bard | G06T 1/60 |
| 2007/0109298 A1* | 5/2007 | Elmieh | G06T 15/005 345/419 |
| 2009/0091563 A1* | 4/2009 | Viz | G06T 13/40 345/419 |
| 2012/0210262 A1* | 8/2012 | Sheeler | G06T 13/20 715/765 |
| 2015/0022517 A1* | 1/2015 | Jutan | G06T 13/40 345/419 |
| 2019/0371031 A1* | 12/2019 | Callegari | G06T 13/40 |
| 2020/0234476 A1* | 7/2020 | Herman | A63F 13/10 |
| 2020/0320764 A1* | 10/2020 | Bryson | G06F 3/04845 |

OTHER PUBLICATIONS https://www.indefiant.com—Indefiant Recode—5 pages.
https://www.liveplusplus.tech—Live++—7 pages.

* cited by examiner

*Primary Examiner* — Ryan M Gray
(74) *Attorney, Agent, or Firm* — Trellis IP Law Group, PC

(57) ABSTRACT

An aspect provides a computer-implemented method for constructing evaluation logic associated with an animation software package. The method comprises receiving at least one software module, the at least one software module including at least one evaluator; writing the at least one software module to at least one executable code object; and maintaining data for the at least one software module in a contiguous block of memory for use by the software module.

20 Claims, 12 Drawing Sheets

FORCED CONTIGUOUS DATA FOR EXECUTION OF EVALUATION LOGIC USED IN ANIMATION CONTROL

CROSS REFERENCES TO RELATED APPLICATIONS

This application claims benefit of the following application, U.S. Provisional Patent Application Ser. No. 63/056,454, entitled METHODS AND SYSTEMS FOR OPERATING ANIMATION CONTROLS AND CONSTRUCTING EVALUATION LOGIC, filed on Jul. 24, 2020, which is hereby incorporated by reference as if set forth in full in this application for all purposes.

This application further claims the benefit of U.S. Provisional Patent Application Ser. No. 63/214,729, entitled ASSIGNING COMPUTING RESOURCES TO EXECUTION OF EVALUATORS OF IMAGE ANIMATION, filed on Jun. 24, 2021, which is hereby incorporated by reference as if set forth in full in this application for all purposes.

This application is further related to the following application, U.S. patent application, Ser. No. 17/379,996, entitled ASSIGNING COMPUTING RESOURCES TO EXECUTION OF EVALUATORS FOR IMAGE ANIMATION, filed Jul. 19, 2021, which is hereby incorporated by reference as if set forth in full in this application for all purposes.

FIELD

The present disclosure generally relates to systems, methods, and User Interfaces (UIs) for operating animation controls and for constructing evaluation logic associated with animation. The disclosure more particularly relates to techniques for generating animation sequence data in a visual content generation system. The methods and systems disclosed below are not limited to animation and visual content systems. The data processing techniques disclosed below, for example, may be applied to different fields.

BACKGROUND

Visual content generation systems are used to generate imagery in the form of still images and/or video sequences of images. The still images and/or video sequences of images may include live action scenes obtained from a live action capture system, computer generated scenes obtained from an animation creation system, or a combination thereof.

An animation artist is provided with tools that allow them to specify the imagery. Where the imagery includes computer generated scenes, the animation artist may use various tools to specify the positions in a scene space, such as a three-dimensional coordinate system of objects. Some objects may be articulated, have multiple limbs and joints that are movable with respect to each other, etc.

The animation artist may retrieve a representation of an articulated object and generate an animation sequence movement of the articulated object, or part thereof. Animation sequence data representing an animation sequence may be stored in data storage, such as animation sequence storage described below.

Animation sequence data may include data time series for control points of an articulated object having controllable attributes. Generating animation sequence data may be a complicated task, when a scene calls for animation of an articulated object.

It is an object of at least one implementation to address at least some of the aforementioned challenges.

SUMMARY

Certain implementations discussed herein facilitate use of a plugin or add-in to a host application (e.g., a computer graphics application, such as a computer animation software package), so as to rapidly execute processes that are usable by the host application, e.g., to facilitate manipulating an animation control rig. Certain implementations may employ an Application Programming Interface (API) for facilitating integrating the add-in (a plugin that may also include other plugins, as discussed more fully below) with the host application. Complex data structures, such as data compounds, can be flattened and stored in blocks of contiguous memory, so as to facilitate rapid access thereto by plugin functionality, e.g., matrix operations, scaling, skinning, and so on.

Various implementations facilitate extending customizability, functionality, and flexibility of the host application, while adding performance improvements for various complex operations.

An example method includes storing data pertaining to a computing object in a contiguous portion of memory; and integrating one or more modules associated with the computing object with one or more host applications, wherein the one or more host applications include an animation software package or other graphics package.

The one or more modules may include one or more functions that are usable by the host application. A UI widget may exhibit one or more UI controls for enabling user control over functionality and use of the one or more functions by the host application.

The one or more functions may include one or more evaluators and control logic for selectively manipulating an animation control rig displayed in the host application.

In one implementation, the one or modules include a module that is limited to receiving one or more fixed-length variables as input to an evaluator thereof. The example method may further include converting variable length data types to be input into the one or more modules into fixed-length data types in advance of providing the data types as input arguments into the one or more modules, i.e., evaluators thereof.

A contiguous block of data may be aggregated among several or many data structures, so that slowdowns from disjointed addressing are reduced or eliminated. A detail pertaining to implementing the compound data structures may include that variable length data types (e.g., a string) are converted to fixed length types.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an implementation the method further comprises receiving at least one edit to the at least one executable code object in a source language; and writing the at least one edit to the at least one executable code object.

In an implementation the at least one software module is received via a User Interface (UI) widget.

In an implementation receiving the at least one software module comprises receiving the at least one evaluator within the UI widget by one or more of: a drag-and-drop action, operation of an input device.

In an implementation receiving the at least one software module comprises receiving the at least one evaluator within the UI widget by retrieving, from a storage device, data representing the at least one evaluator.

In an implementation the at least one software module includes a plurality of evaluators.

In an implementation writing the at least one software module to at least one executable code object comprises: writing the at least one software module to at least one source language code object; executing the at least one source language code object; and on receiving an instruction to compile the at least one source language code object, compiling the at least one source language code object to generate the at least one executable code object.

In an implementation executing the at least one source language code object is performed by an interpreter.

In an implementation compiling the at least one source language code object is performed by a compiler, the method further comprising executing the at least one executable code object.

In an implementation the at least one software module includes multiple deformation processes to be applied to an input mesh, and wherein the at least one executable code object when executed applies the multiple deformation processes as a stack to the input mesh to produce an output mesh.

In an implementation the method further comprises scheduling execution of the at least one executable code object.

In an implementation the method further comprises on detecting that the at least one executable code object is stored on a first computing device, allocating resources on the first computing device to schedule execution of the at least one executable code object.

In an implementation the method further comprises allocating resources on a second computing device selected from a plurality of computing devices to schedule execution of the at least one executable code object.

In an implementation allocating resources on the second computing device is based at least partly on a location of the second computing device.

In an implementation allocating resources on the second computing device is based at least partly on availability of the second computing device.

BRIEF DESCRIPTION OF THE DRAWINGS

Various implementations in accordance with the present disclosure will be described with reference to the drawings, in which:

FIG. 12 illustrates an example computing environment that includes an add-in or plugin to a host application, and wherein the add-in includes or leverages functionality for collecting and organizing data structures, and/or portions thereof in local cache memory, thereby facilitating fast access to the data structure by functionality of the add-in.

DETAILED DESCRIPTION

Figure 1:
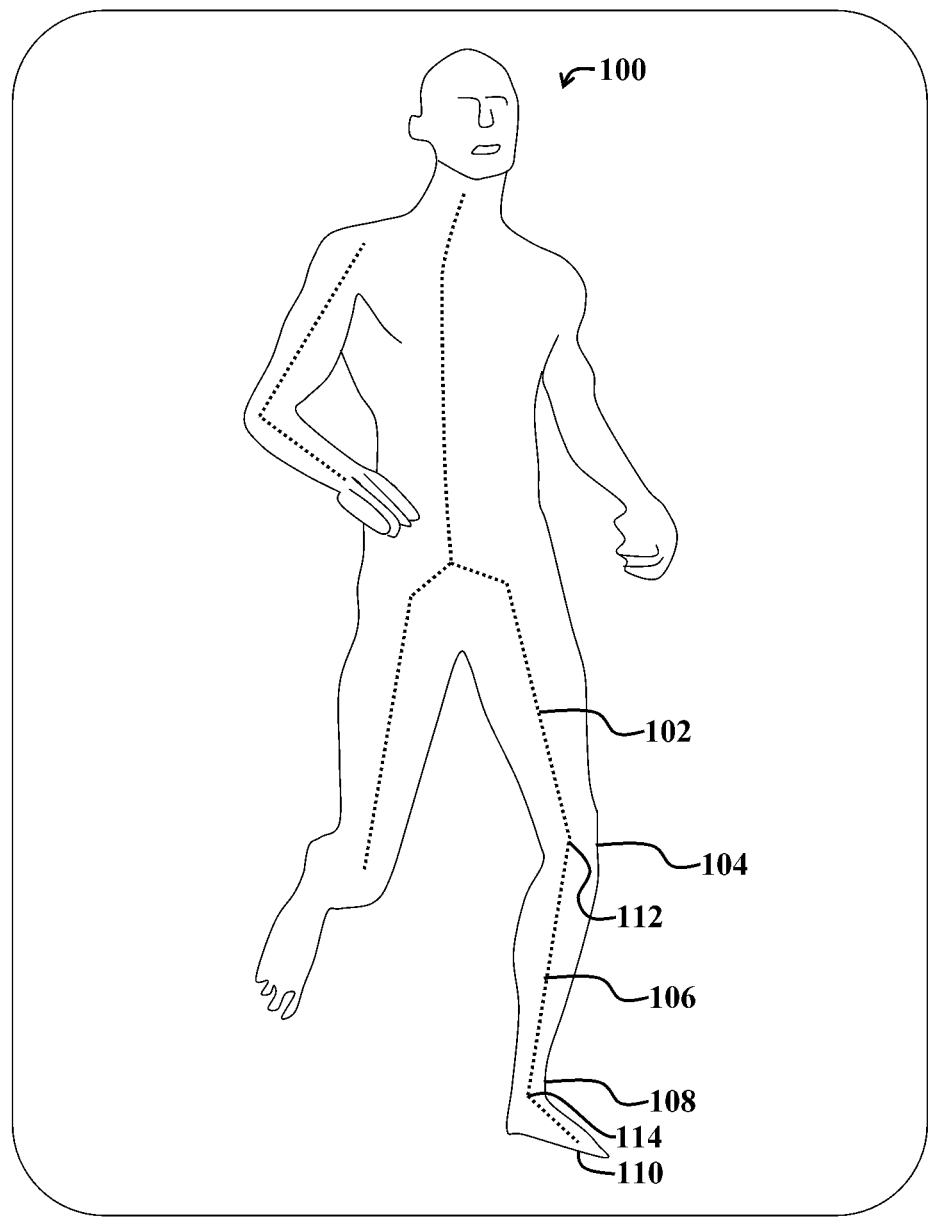
FIG. 1 shows an example of a control rig configured to enable an artist to create animation sequence data.

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

The present disclosure generally relates to methods and systems for operating animation controls and for constructing evaluation logic associated with developing animation content. The disclosure more particularly relates to techniques for generating animation sequence data in a visual content generation system.

For the purposes of the present discussion, a computing environment may be any collection of computing resources used to perform one or more tasks involving computer processing. A computer may be any processor in communication with a memory.

A computing resource may be any component, mechanism, or capability or quantities thereof of a computing environment, including, but not limited to, processors, memories, software applications, user input devices, and output devices, servers, data, and so on.

A variable may be any data container for holding data that may vary. A variable name may be any information that can be used by a computer process to reference the variable and extract data therefrom.

A data structure may be any collection or organization of data and/or functionality. This may include computing objects, programming language classes, enumerated types, arrays, compound data structures, and so on. A compound data structure may be any hierarchical arrangement of or nesting of inter-related data structures.

An argument may be any input to a function, procedure, or other computer process. An argument description may be any information describing one or more inputs to the function, procedure, and/or other computer process. Accordingly, a variable may be provided as an argument to a given function, procedure and/or other computer process.

An evaluator may be any function, procedure, and/or other computer process that takes one or more arguments as input and provides one or more outputs. Generally, in the context herein, evaluators pertain to functions used by computer graphics programs.

A computer graphics program may be any software program or suite of programs (e.g., a software package) that is adapted to facilitate adjustment and/or control of visually displayed items, e.g., items presented on a computer monitor and/or other display device (e.g., television, etc.). Accordingly, animation software used to generate animations for movies, games, videos, and so on, represents a type of computer graphics software.

For clarity, certain well-known components, such as the Internet, hard drives, processors, power supplies, routers, Internet Service Providers (ISPs), middleware, and so on, are not necessarily explicitly called out in the figures. However, those skilled in the art with access to the present teachings will know which components to implement and how to implement them to meet the needs of a given implementation.

FIG. 1 shows an example of a control rig 100, or animated skeleton. The control rig 100 is configured to enable an artist to create animation sequence data. Animation sequence data is typically in the form of time series of data for control points of an object that has user-controllable attributes. In some examples, the object includes a humanoid character with limbs and joints that are movable in manners similar to typical human movements.

Here, the control rig 100 represents a humanoid character, but may be configured to represent one or more different characters. In an implementation, the control rig 100 includes a hierarchical set of interconnected bones, connected by joints, forming a kinematic chain.

For example, the control rig 100 includes a thigh 102, a knee 104, a lower leg 106, an ankle 108, and a foot 110, connected by joints 112, 114. The control rig 100 may be employed to individually move individual bones and joints using forward kinematics to pose a character. Moving the thigh 102 causes a movement of the lower leg 106, as the lower leg 106 is connected to the thigh 102 via the knee 104. The thigh 102 and the lower leg 106, for example, are in a parent-child relationship. Movement of the lower leg 106 is a product of movement of the thigh 102 as well as movement of the lower leg 106. The control rig 100 may also use inverse kinematics, in which, for instance, an artist moves the ankle 108. If an artist moves an ankle 108 upwards; then the knee 104 consequently bends and moves upwards to accommodate a pose in which the ankle 108 is at a user specified location.

Figure 9:
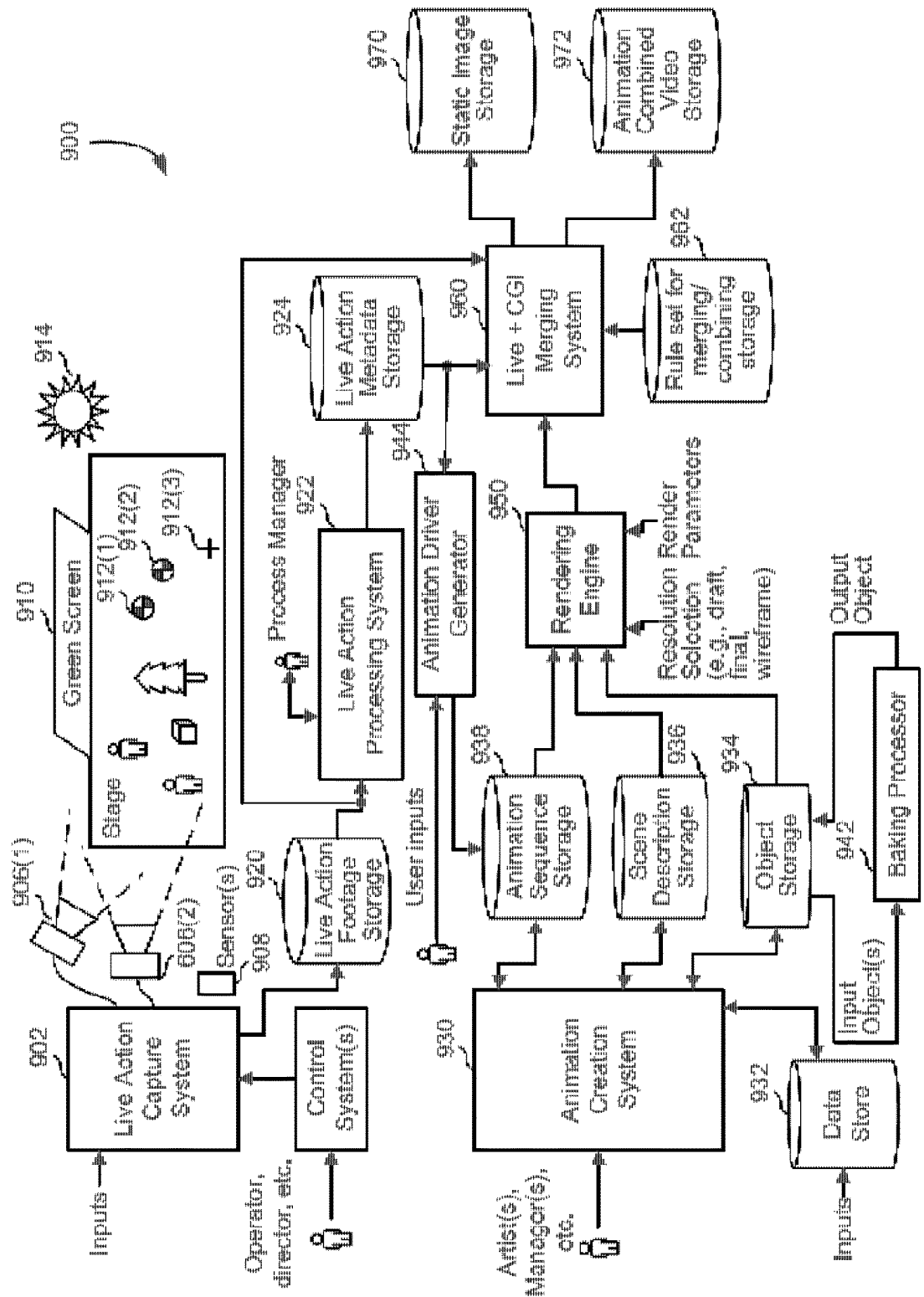
FIG. 9 illustrates an example visual content generation system as might be used to generate imagery in the form of still images and/or video sequences of images.

The control rig 100 may be formed using a plurality of data points. The control rig 100 may be matched to a skeleton obtained from an animation system, or from, for example, motion capture markers or other means on real-life actors. A live action scene of a human actor is captured by a live action capture system 902 (as shown in FIG. 9) while wearing mocap (motion capture) fiducials; for example, high-contrast markers, affixed to actor clothing. The movement of those fiducials is determined by live action processing system 922. An animation driver generator 944 may convert that movement data into specifications of how joints of an articulated character are to move over time.

Figure 2:
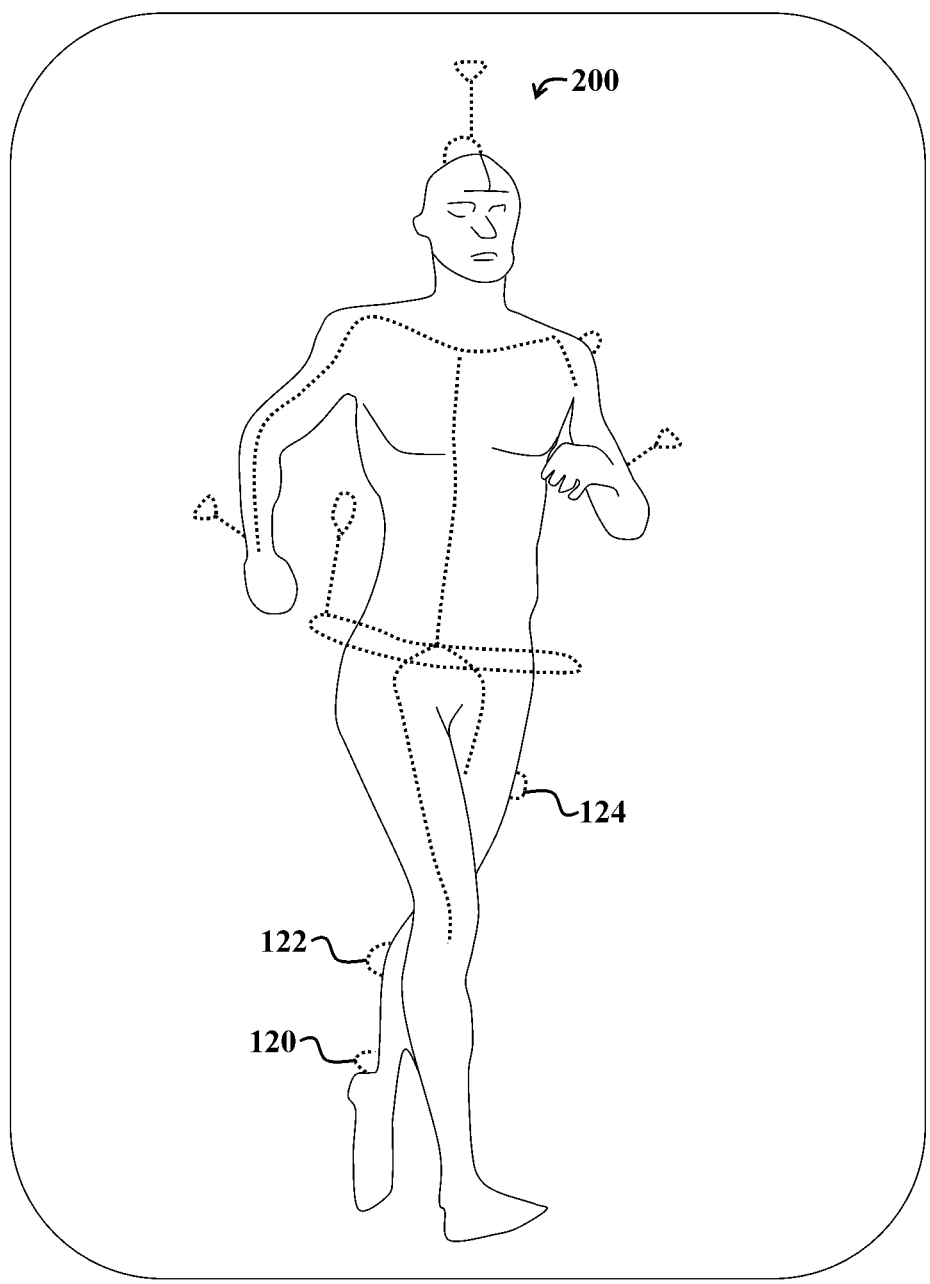
FIG. 2 shows examples of animation control points associated with the control rig of FIG. 1.

FIG. 2 shows examples of animation control points 120-124 of a skeleton 200 associated with the control rig of FIG. 1. As shown in FIG. 2, a repositioned (relative to FIG. 1) control rig 200 includes a plurality of animation control points 120-124, also simply called control points. Examples of control points are indicated at 120, 122, and 124. For example, in an implementation, the control rig 200 includes a first control point 120 at an ankle, which allows an animator to control the motion of a leg of the control rig 200. In another example, a second control point 122 is positioned at a lower leg of the control rig 200. A third control point 124 is positioned at an upper leg. Different parts of the control rig 200 are associated with respective control points.

Figure 8:
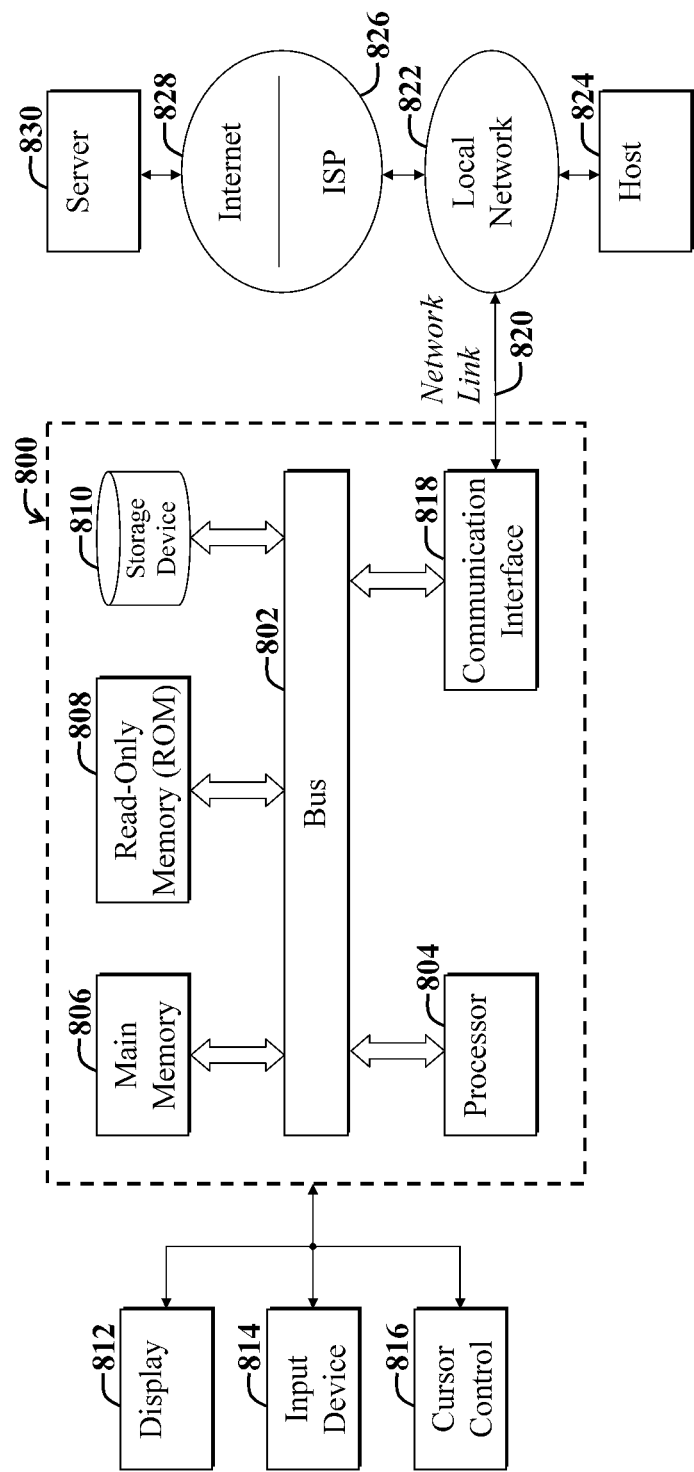
FIG. 8 is a block diagram illustrating an example computer system upon which computer systems disclosed below may be implemented.

In an implementation, an artist creates an animation sequence by selecting a control point (e.g., one or more of the points 120-124 and/or other points not labeled) on the control rig 200. With reference to FIGS. 2 and 8, the control rig 200 of FIG. 2 may be displayed, for example, on a display 812 of FIG. 8. The artist selects a control point (e.g., one or more of the points 120-124 of FIG. 2) using an input device 814 of FIG. 8, and/or a cursor control 816 of FIG. 8. The control points 120-124 may be displayed as extending from a character represented by the control rig 200. Displaying the control points 120-124 in this manner enables the artist to easily select a control point.

The artist may, for example, select the control point 122 for the lower leg, or the control point 124 for the upper leg of the control rig 200. The artist selects a position and/or location of the control point that is different to the current position and/or location of the control point. This process is known as key-framing The artist moves controls to new positions at given times, thereby creating key poses in an animation sequence. Interpolation is performed between key poses.

In an implementation, control points may be used to control more than one bone. For example, a control point may be used to control the upper arm and lower arm simultaneously.

In an implementation, at least one inverse kinematics operation is performed in order to generate an animation sequence specified by the artist. For example, the artist may wish to specify that the ankle 108 of the control rig 100 of FIG. 1 is to move from a first location to a second location, resulting in the repositioned control rig 200 as shown in FIG. 2. The artist may manipulate the control point 120 to specify a desired change in ankle location.

A series of calculations is performed to determine what changes in location and/or orientation of parts of the control rig 100 of FIG. 1 are required to result in an updated orientation shown in the updated control rig 200 of FIG. 2. For example, a new location of the first control point 120 of FIG. 2 selected by the artist may require a change in location and/or orientation of at least the thigh 102, the knee 104, the lower leg 106, the ankle 108 and the foot 110 of FIG. 1. The changes in location and/or orientation that are required to achieve a goal of the artist are then determined.

Figure 3:
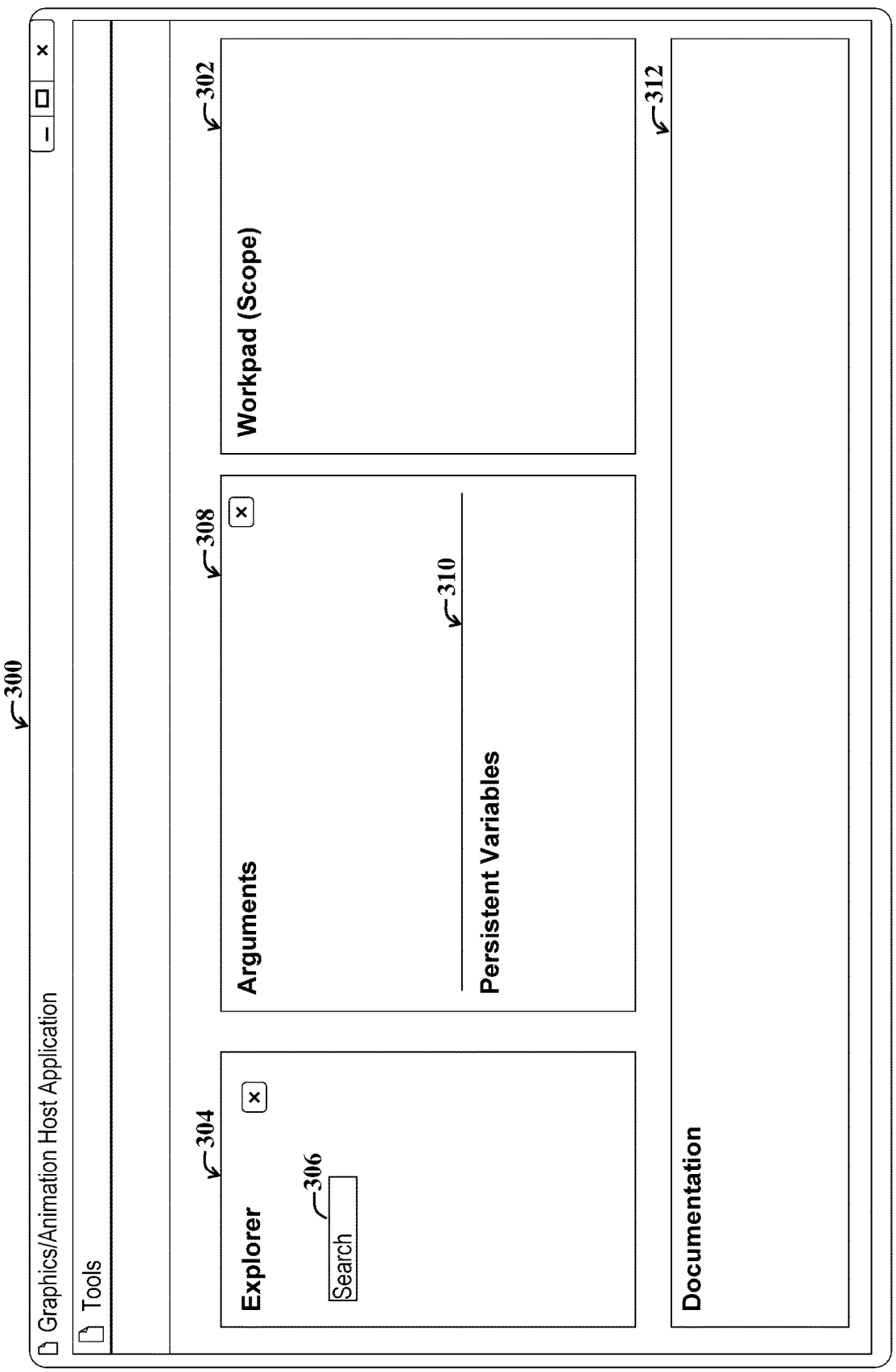
FIG. 3 shows an example of a user interface that may be used to author evaluation logic associated with the animation control rig of FIG. 1.
Figure 5:
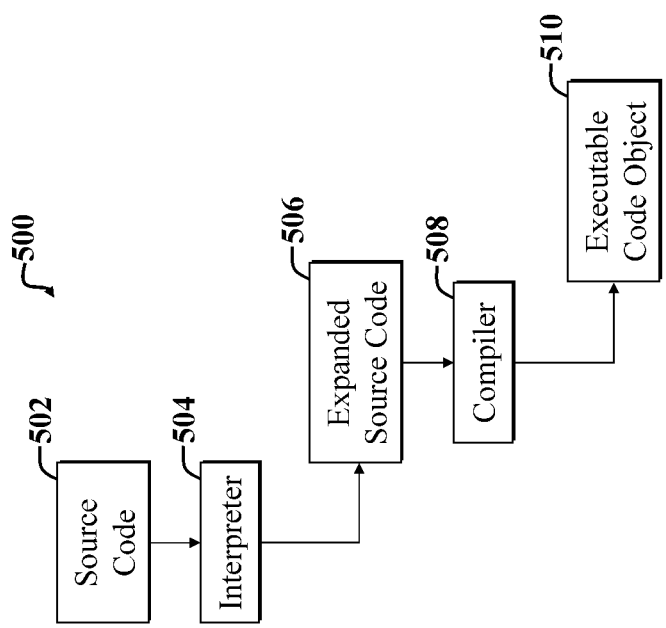
FIG. 5 shows an example of a process for compiling and testing evaluation logic.

FIG. 3 shows an example of a user interface 300 that may be used to author evaluation logic and to generate an executable code object 510 (as shown in FIG. 5), which may represent an evaluator. An executable code object may be any collection of executable code that is derived from functions, calls, datatypes, arguments, variables (local or global variables), etc. With reference to FIGS. 3 and 5, the executable code object 510 of FIG. 5 may be compiled into a single execution block, or may be converted to any number of deferent types of compliable and executable codes, such as C++, Python, etc. In an implementation, the executable code block 510 of FIG. 5 comprises compiled code.

In some implementations, the executable code object 510 of FIG. 5 may be used to generate blocks of other executable code for execution before or during runtime. Such execution blocks may be generated to assist in increasing the speed and efficiency of operations pertaining to animation operations, such as sketching, generating, animating, lighting, shading, skinning, etc.

In one example, the user interface 300 of FIG. 3 may be employed to create the executable code objects 510 of FIG. 5, which may be used to operate animation controls and implement animation functions, such as guiding skeletal positions, and/or other functions associated with an animation control rig, e.g., the animation control rig 100 of FIG. 1, and also may be used with other aspects of animation development, such as lighting, physical simulation, character skinning, etc. Animation controls may be defined and operated on using a Graphical User Interface (GUI) via an animation software package. The animation controls may then be passed as inputs to evaluation logic defined in the user interface 300 of FIG. 3.

In an implementation, the user interface 300 of FIG. 3 is presented on a display, e.g., the display 812 of FIG. 8. Inputs are received, for example, by a user operating the input device 814 and/or cursor control 816 of FIG. 8.

In an implementation the user interface 300 of FIG. 3 includes a working canvas 302. The working canvas 302 is configured to receive evaluation logic from a user. Evaluation logic may include, for example, building blocks involving math, geometry, drawing and algorithms Evaluation logic may also include user authored functions written in a source language such as C++, Visual Basic, Python, and the like.

In an implementation, the working canvas 302 is configured to enable a user to populate the working canvas 302 using the input device 814 of FIG. 8, such as a keyboard, mouse, or other input mechanism. The user may, for example, operate the input device 814 of FIG. 8 to enter text into the working canvas 302 of FIG. 3. The user may also select and copy text into a main memory 806 of FIG. 8, and then paste the resulting copied text into the working canvas 302 of FIG. 3.

Alternatively or additionally, the working canvas 302 of FIG. 3 is configured to be populated by a user operating the cursor control 816 and input device 814 of FIG. 8, so as to enable performing a drag-and-drop action on components from other windows or within the user interface 300 of FIG. 3. These components may include graphical objects, such as nodes from a visual graph, text, or a combination of graphical objects and text.

In an implementation, the working canvas 302 and other components within the user interface 300 are configured to be populated by retrieving, from the storage device 810 and/or main memory 806 of FIG. 8, data representing a stored executable code object.

The working canvas 302 of FIG. 3 may include controls configured to receive a user selection to expand or collapse at least some displayed lines of code. For example, the user may wish to expand all function calls so that they may be viewed in the working canvas 302. Alternatively, the user may wish to hide all entries in a conditional selection state. The user may select a control that causes at least some of the entries in the conditional to be collapsed or hidden.

The user interface 300 of FIG. 3 includes an explorer panel 304. The executable code entered into the working canvas 302 may include functions, datatypes, or the like. In an implementation, the explorer panel 304 includes search bar 306 that is configured to receive a user search query for at least one function or datatype. The search query is executed against a library of stored functions, datatypes, data, etc. The results of the user query may be displayed within the explorer panel 304, e.g., below the search bar 306.

In an implementation, the explorer panel 304 is configured to receive a user selection of a function or datatype that is included in the results of the user query. The selected function or datatype may be dragged and dropped by the user into the working canvas 302. The working canvas 302 may be configured to receive a user selection for the function or datatype of a location within code displayed in the working canvas 302. For example, the user may drop a selected function, datatype, etc., at a selected location within the code.

The user interface 300 may include an arguments panel 308. This arguments panel 308 displays data that is visible to functions, modules, and components having access to the code displayed in working canvas 302. The arguments panel 308 may facilitate making data visible to the host application and accompanying functions and modules, and optionally, to other functions/modules of other software applications. The arguments panel 308 may display, for example, an argument name, whether or not the argument value is constant or mutable, an associated processor for example CPU, and a datatype for example 'int'.

The user interface 300 may include a persistent variables panel 310 that is configured to display variables that are global in nature. In an implementation, persistent variables remain in use and keep their respective values over multiple executions of the associated evaluation logic that makes use of the variables. Persistent variables are not typically shared between different characters.

The user interface 300 may also include a documentation panel 312. In an implementation, the documentation panel 312 displays any documentation associated with a selected function. For example, the user interface 300 may receive a user selection of a function. The documentation panel 312 displays documentation associated with the function that user selected.

In an implementation evaluation logic is executed in a linear fashion, e.g., from top to bottom. The evaluation logic that is displayed in working canvas 302 is packaged into an executable code object. Examples of how such executable code objects are manipulated are further described below.

Figure 4:
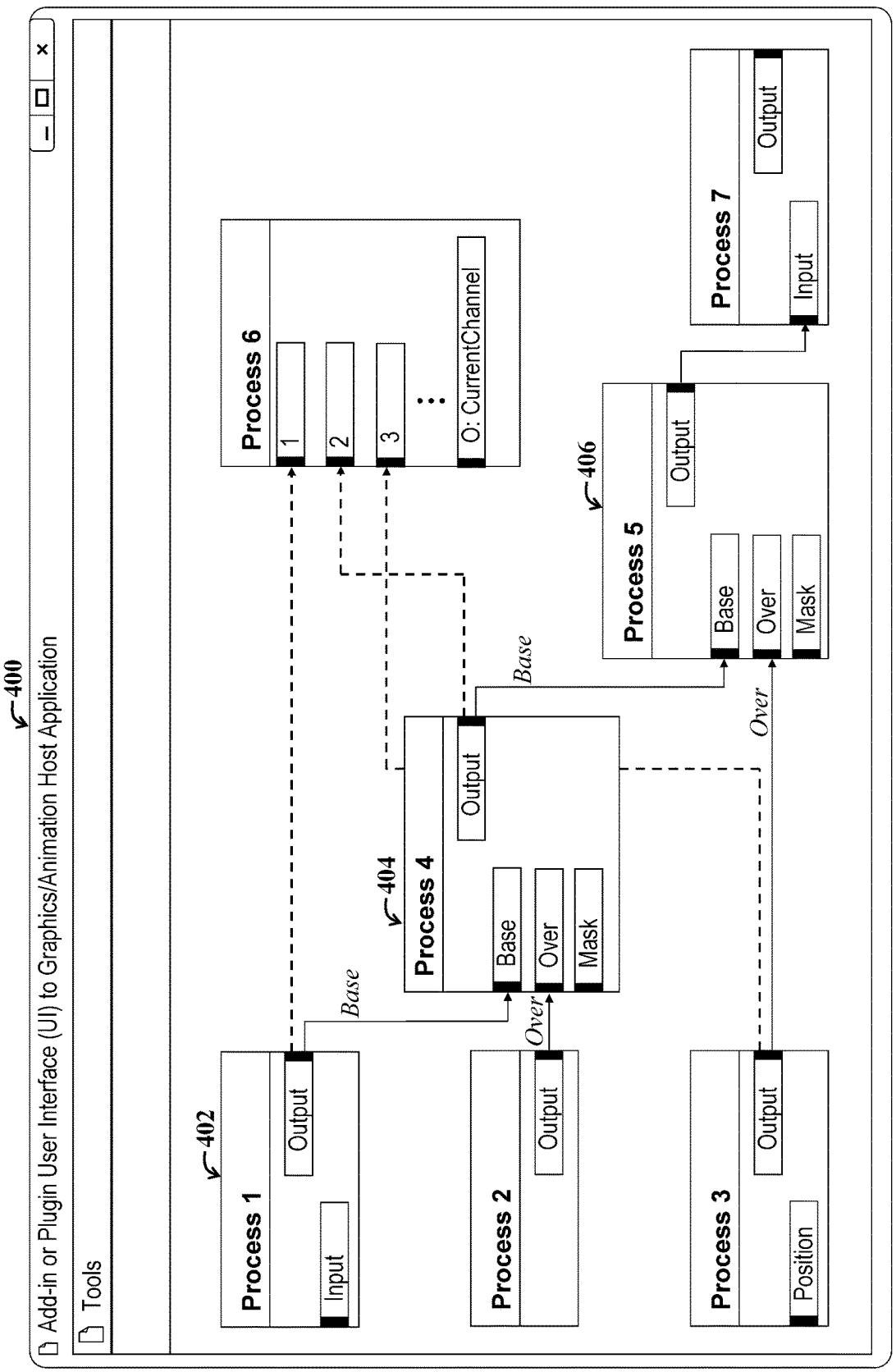
FIG. 4 shows an example of a hierarchical node graph suitable for implementing the control rig of FIG. 1.

FIG. 4 shows an example of a hierarchical node graph 400 that is suitable for implementing the control rig 100 of FIG. 1 and the control rig 200 of FIG. 2. The node graph 400 includes a plurality of nodes, examples of which are shown at 402, 404, and 406. At least some of the nodes 402-406 are associated with at least one input and at least one output.

In an implementation, one or more nodes of the hierarchical node graph 400 represent respective animation control points of the control rig 100 of FIG. 1. Outputs from individual nodes may include, for instance, the solved positions of each joint angle and bone position in the kinematic chain. In inverse kinematics, the new joint angles and positions are determined relative to the control input. Inputs to the individual nodes include the new position of a member that is then used to calculate the position of the other members of the skeleton and the associated joint angles. For example, moving the hand from a first position resting on the ground to a new position above the ground will be used to determine the position of the forearm, upper arm, and elbow, and shoulder.

In an implementation, the user interface 300 of FIG. 3 is configured to enable a user to easily construct evaluation logic. For example, the user may populate the working canvas 302 with evaluation logic using one or more input devices (e.g., the input device 814 of FIG. 8). The user may, for example, operate the input device 814 of FIG. 8 to enter text into the working canvas 302 of FIG. 3. The user may also select and copy text into the main memory 806 of FIG. 8, and then paste the copied text into the working canvas 302 of FIG. 3.

Alternatively or additionally, the working canvas 302 is configured to be populated by a user operating the cursor control 816 and input device 814 of FIG. 8 to perform a drag-and-drop action on components from other windows or within the user interface 300 of FIG. 3. These components may include graphical objects, such as nodes, from a visual graph, text, or a combination of graphical objects and text.

In an implementation, working canvas 302 and other components within user interface 300 are configured to be populated by retrieving, from storage device 810 and/or main memory 806, data representing evaluation logic. Items may be dragged and dropped from the explorer panel 304 and/or the arguments panel 308 of FIG. 3 into other areas of the user interface 300, such as into the working canvas 302.

An executable code object may create a module that is saved and reused. For example, the created module may be made available to other users. Some of the modules may include multiple evaluators. The user interface 300 is configured to enable at least some of the evaluators from a module to be reused across different modules.

In an implementation, the user interface 300 is configured to write modules that are authored in the workpad 302 to a plugin. One example of a plugin is a shared library of executable code obtained by compiling a source language or lower level programming language such as C++. A plugin may describe evaluators and data similar to a module. However, a sophisticated user is able to edit and author source code for a plugin that is then compiled and made available to other users.

A user, for example, may author evaluation logic using high level modules. The high level modules may provide a level of abstraction and/or constraint to the user. Alternatively or additionally, the user may author evaluation logic as plugins in a lower level source language. The lower level source language generally imposes fewer constraints on the user. Modules and/or plugins are available for reuse by other users, for example, to add new data types and/or functions. The evaluators of a plugin may also be used within a module.

In an implementation, the user interface 300 of FIG. 3 allows for the creation of compound data types. A compound data type may refer to, for example, a film or motion picture.

In an implementation, modules associated with the user interface 300 are configured to arrange compounds (i.e., compound data types) into one block of memory, for example, as a single data structure, thereby speeding up data access.

FIG. 5 shows an example of a process 500 for compiling and testing evaluation logic. In an implementation, at least one data file is authored in source code 502. An example of a source code language is C++. The process 500 writes at least one software module to at least one executable code object.

In an implementation, multiple data files in the source code 502 are associated with respective functions and data types. The data files are configured so as to annotate the functions and data types with which the data files are associated. The data files and/or software modules are written to at least one source language object.

In an implementation, the process 500 includes an interpreter 504 as part of a build process. The source language object(s), in the form of source code 502, is passed to the interpreter 504. One example of an interpreter 504 is the CLING™ interpreter. The interpreter 504 processes the source language code object(s). In an implementation, the interpreter 504 highlights any errors in source code 502 before source code 502 is compiled.

In an implementation, interpreter 504 generates expanded source code 506, which may then be automatically passed to a compiler 508. In certain implementations, a user may have an option to selectively control passage of the expanded source code 506 to the compiler 508.

Upon receiving a user instruction to compile the source language code object(s) 502 and/or the expanded source code 506, the compiler 508 then compiles the source language code object(s) and/or expanded source code 506 to generate at least one executable code object 510. In certain implementations, the compiler 508 may be implemented using the CLANG™ compiler. The compiler 508 generates executable code object(s) 510 that is/are stored for either immediate use or subsequent use.

The process 500 may potentially reduce the need to frequently restart compilation during software development. Changes to compiled code can be made on the fly, in the same way as changes to code that is interpreted.

Figure 6:
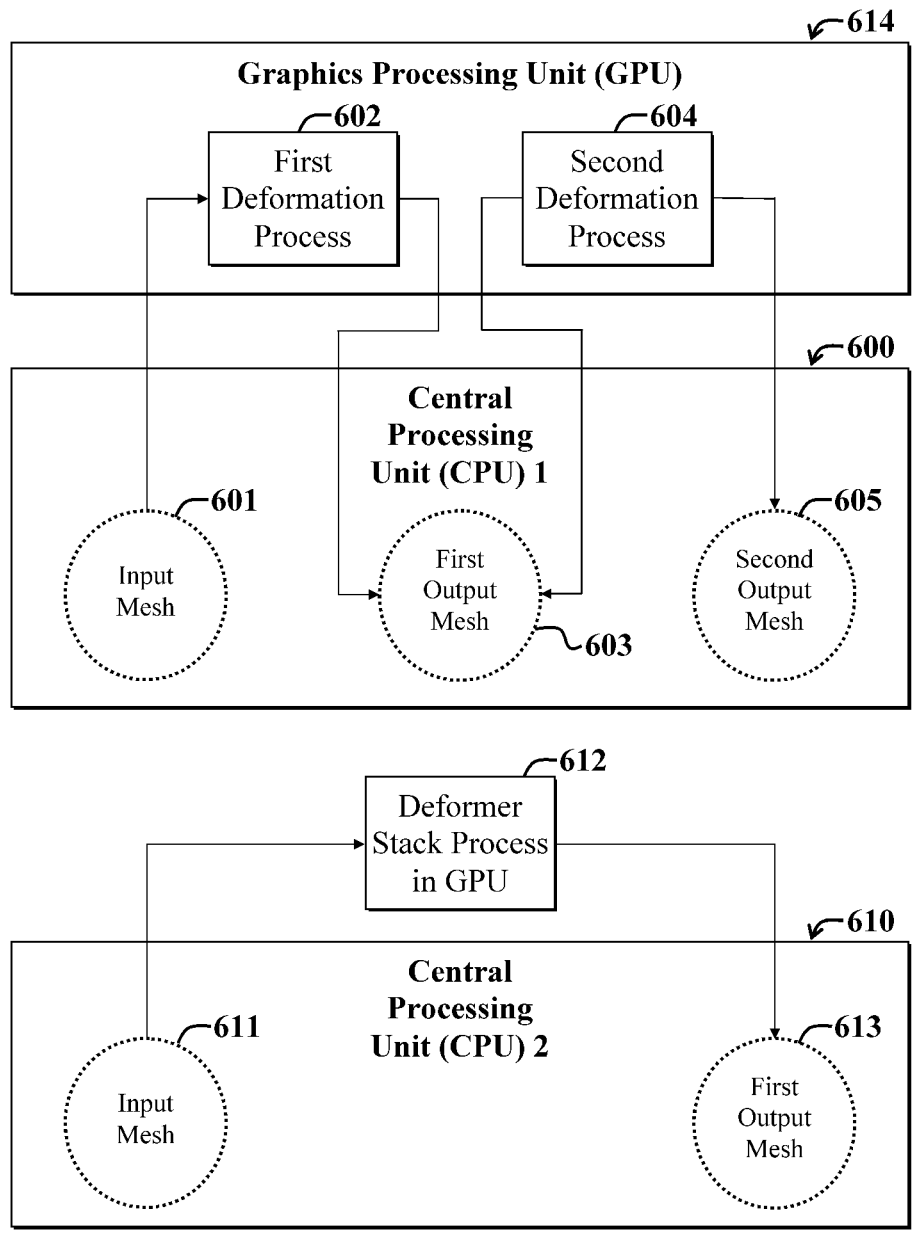
FIG. 6 shows an example of an extension that can be applied to the user interface of FIG. 3.

FIG. 6 shows an example of an extension 600 that can be applied to the user interface 300 of FIG. 3.

Various animation creation tools may be used to input a mesh, take deformations from an artist, then provide an output mesh. Because of the processing flow back and forth between various memories when uploading and downloading the mesh, processing is potentially slow. Accordingly, real-time processing can be problematic.

For example, an input mesh 601 that requires a deformation has to be uploaded to a Graphics Processing Unit (GPU), e.g., a GPU 614, using a first deformation process 602 running on the GPU 614. A first output mesh 603 of the first deformation process is then downloaded back to the first CPU 600. When multiple deformation processes are required to be operated on a mesh, multiple upload and download operations would have to be performed, which may decrease processing efficiency.

In this case, the first output mesh 603 is uploaded to the GPU for a second deformation process 604. A second output mesh 605 is then downloaded back to the first CPU 600. Any further deformation processes would require the second output mesh 605 to be re-uploaded to the GPU 614.

A deformer stack process 612 may represent a combination of multiple deformation processes, such as first deformation process 602 and second deformation process 604, within the GPU 614. The deformer stack 612 operates on an input mesh 611 to produce a final output mesh 613. In the example where deformation processes 602 and 604 are required, the final output mesh 613 is equivalent to second output mesh 605.

A 'stack' may refer to a chain of deformations presented as a list of deformers. The combination of multiple deformers prevents multiple output meshes 603 or 605 from having to be downloaded from and uploaded back to the GPU for a chain of deformations. In an implementation, the deformer stack 612 may be authored within user interface 300 of FIG. 3.

Figure 7:
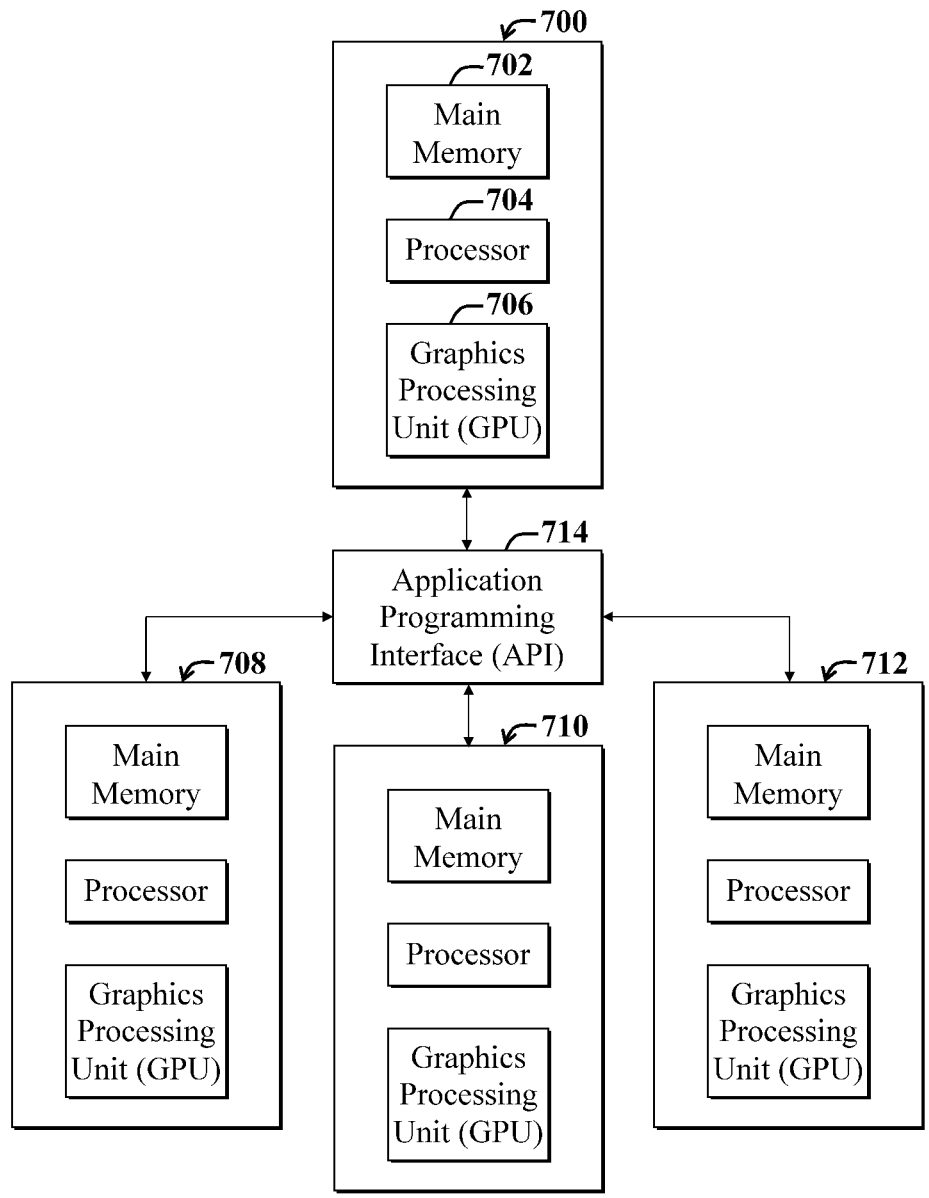
FIG. 7 shows an example of allocation of memory efficiently between devices.

FIG. 7 shows an example of allocation of computing resources, such as memory, efficiently between devices. A first computing device 700 represents an example of a computer system, such as a computer system 800 of FIG. 8. The first computing device 700 includes a main memory 702, processor 704, and GPU 706. The first computing device 700 is connected to further devices 708, 710, and 712, for example, via a network link, such as a network link 820 of FIG. 8.

In an implementation, the first computing device 700 is provided with an application programming interface (API) 714 that is configured to enable parallel and/or concurrent computing. For example, computing devices 700, 708, 710 and 712, together with the API 714, may be configured as a parallel and/or concurrent computing platform and API model, such as the CUDA™ model. The API 714 is configured to facilitate scheduling computations on multiple computing devices. In an implementation, a CUDA™ API is implemented on at least one of individual devices 700, 708, 710, 712.

The first computing device 700 may receive executable code objects as described above. The executable code objects are initially stored in the main memory 702 before being copied to the GPU 706. The CPU/processor 704 initiates the GPU compute kernel.

In some situations, the executable code objects are stored on the device on which the executable code objects are to be executed. For example if the executable code objects are stored on device 700, the resources may be allocated on device 700 to schedule execution of the executable code objects.

In other situations, it is necessary to transfer the executable code objects to another device. In such situations, the API 714 distributes the processing load of the executable code objects by allocating execution of the executable code objects among one or more of: the computing devices 708, 710, and 712.

Outputs from computing devices 708, 710 and/or 712 are collated and stored in the main memory 702 of the first computing device 700.

In an implementation the process for allocation of processing loads between the computing devices 700, 708, 710 and/or 712 is/are at least partially automated. A user operating, for example, the user interface 300 of FIG. 3, is not required to manually allocate processor loads to various computing devices.

In an implementation the API 714 is configured to allocate resources based at least partly on respective locations of computing devices. For example, the API 714 could allocate processing requests to all devices within a predefined radius in order to reduce or minimize network latency.

In an implementation, the API 714 is configured to allocate resources based at least partly on availability. For example, the API 714 could allocate more processing requests to a computing device that is idle and allocate fewer processing requests to a device that is already in heavy use.

According to one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 8 illustrates a block diagram that illustrates a computer system 800 upon which the systems and methods described above and/or visual content generation system 900 of FIG. 9 may be implemented. The computer system 800 includes a bus 802 or other communication mechanism for communicating information, and a processor 804 coupled to the bus 802 for processing information. The processor 804 may be, for example, a general purpose microprocessor.

The computer system 800 also includes a main memory 806, such as a random access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a computer monitor, for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement the techniques described herein using customized hard-wired logic, one or more ASICs or FPGAs, firmware and/or program logic which in combination with the computer system causes or programs the computer system 800 to be a special-purpose machine. According to one implementation, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 810. Volatile media includes dynamic memory, such as the main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid state drive of a remote computer. The remote computer can load the instructions into its dynamic memory and send the instructions over a network connection. A modem or network interface local to the computer system 800 can receive the data. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), the network link 820, and communication interface 818. In the Internet example, a server 830 might transmit a requested code for an application program through the Internet 828, ISP 826, local network 822, and communication interface 818. The received code may be executed by the processor 804 as it is received, and/or stored in the storage device 810, or other non-volatile storage for later execution.

For example, FIG. 9 illustrates the example visual content generation system 900 as might be used to generate imagery in the form of still images and/or video sequences of images. The visual content generation system 900 might generate imagery of live action scenes, computer generated scenes, or a combination thereof. In a practical system, users are provided with tools that allow them to specify, at high levels and low levels where necessary, what is to go into that imagery. For example, a user, such as an animation artist, might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap" or "mocap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), which might be used post-capture to determine where an object was during capture. A live action scene might be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 might be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene, and generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from a rulesets for merging/combining storage 962. A very simple example of a rule in a ruleset might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some implementations, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Figure 10:
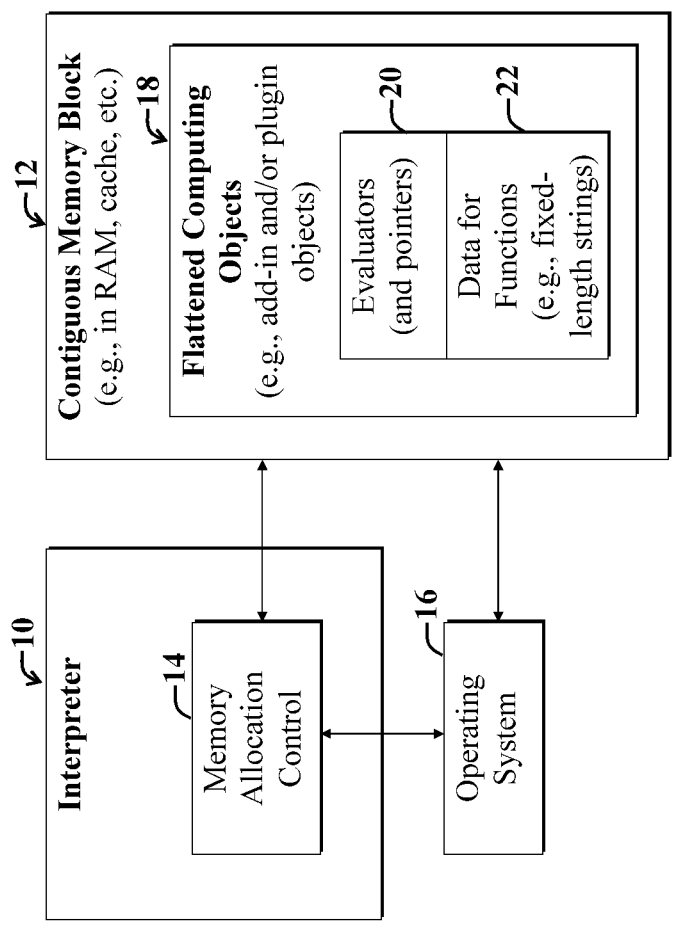
FIG. 10 illustrates example modules used for allocating memory for one or more flattened computing objects (e.g., corresponding to software modules of a plugin or add-in to a host application) and accompanying data in a contiguous block of memory.

FIG. 10 illustrates example modules 10-22 used for allocating memory for one or more flattened computing objects (e.g., corresponding to software modules of a plugin to a host application) and accompanying data in a contiguous block of memory 12.

In the example implementation, one or more software modules of a plugin or add-in to a host application (e.g., an animation and/or graphics software program and/or package) are flattened into a flat file, e.g., via functionality of an interpreter 10.

The example interpreter 10 includes a memory allocation controller 14 that communicates with an operating system 16 used by a host application (e.g., a graphics application, such as an animation software package), so as to facilitate allocating at least a portion of resulting flattened computing objects 18 in the continuous memory block 12.

The flattened computing objects 18 may include functions and associated pointers 20 and data 22 used by the functions. Storing the data 22 in the contiguous memory block 18 in proximity to the functions 20 facilitates rapid access to the data 22 by the evaluators 20.

Accordingly, certain implementations discussed herein facilitate fast execution of processes of a plugin or add-in to a host application, due in part to the way data is stored in contiguous blocks of Random Access Memory (RAM) and/or cache memory (e.g., level 1, 2, 3, etc. cache).

A contiguous block of data may be aggregated among several or many data structures so that slowdowns from disjointed addressing are eliminated. A detail in implementing the contiguous memory blocks includes that variable length data types (e.g., a string) may first be converted to fixed length types.

Figure 11:
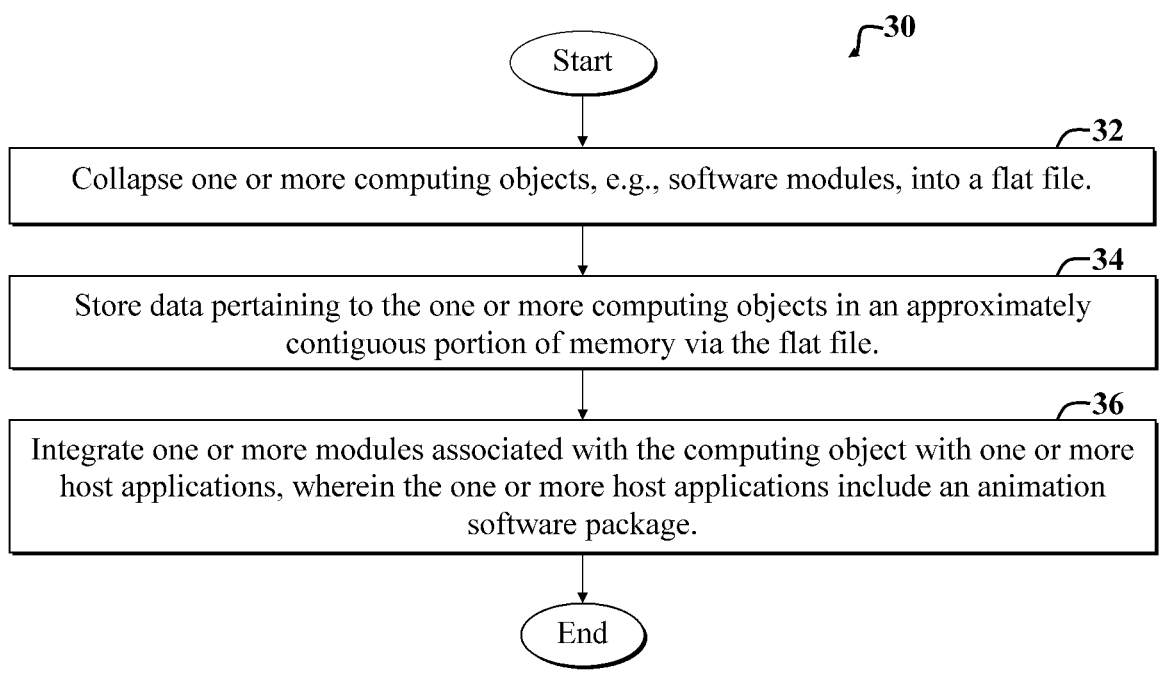
FIG. 11 illustrates an example method usable with the modules of FIG. 10.

FIG. 11 illustrates an example method 30 usable with the modules of FIG. 10. The example method 30 facilitates implementing evaluation logic associated with a host application, via a plugin or add-in to the host application.

A first step 32 includes collapsing one or more computing objects, e.g., software modules, into a flat file.

A second step 34 includes storing data pertaining to a computing object in portion of contiguous memory via a flat file.

A third step 36 includes integrating one or more modules associated with the computing object with one or more host applications, wherein the one or more host applications include an animation software package.

Note that the method 30 may be modified, without departing from the scope of the present teachings. For instance, the method 30 may further specify that the one or more modules include one or more functions usable via the host application.

The example method 30 may further include a step of providing a UI widget with one or more UI controls for enabling user control over functionality and use of the one or more functions by the host application.

The one or more functions may include one or more evaluators and control logic for selective manipulation of an animation rig within the host application. For instance, one or more functions may include a scaling function to selectively scale a rendered object. The one or modules include may a module that is limited to receiving one or more fixed-length variables.

The example method may further including converting variable length data types to be input into the one or more modules into fixed-length data types in advance of providing the data types as input arguments into the one or more modules.

The one or more modules may include a hierarch of modules, and may employ middleware or integration software (e.g., Application Programming Interfaces (APIs) middleware for facilitating use of functionality provided by the one or more modules.

The integration software may include an interpreter that is integrated with one or more host applications. The interpreter may be configured to interpret and compile C++, e.g., using Just-In-Time (JIT) compilation.

The plugin or add-in may further employ one or more modules to expose user versioning control of modules via the one or more host applications. An API may facilitate exposing functionality of the one or more modules to the one or more host applications.

The example method 30 may further specify the selective restriction of use of a given process to run on a Graphics Processing Unit (GPU) or a Central Processing Unit (CPU).

Another example method includes receiving a command to execute the evaluation logic, wherein the evaluation logic includes at least two data structures that would be stored noncontiguously (discontiguously) in a memory by a compiler; modifying a reference to at least one of the two data structures so that the two data structures are stored contiguously in the memory; storing the data structures in association with a computing object that implements at least a portion of the evaluation logic; integrating one or more modules associated with the computing object with one or more host applications, wherein the one or more host applications includes an animation software package; and implementing the evaluation logic by executing the computing object using the two data structures in contiguous memory.

Another example method includes the following steps: receiving a command to execute the evaluation logic, wherein the evaluation logic includes at least two data structures that would be stored discontiguously in a memory by a compiler; modifying a reference to at least one of the two data structures so that the two data structures are stored contiguously in the memory; storing the data structures in association with a computing object that implements at least a portion of the evaluation logic; integrating one or more modules associated with the computing object with one or more host applications, wherein the one or more host applications includes an animation software package; and implementing the evaluation logic by executing the computing object using the two data structures in contiguous memory, and the animation software package to cause an animation of the animation control rig.

This method may further specify that the one or more modules include one or more functions usable via the host application. The example method may further include providing a UI widget with one or more UI controls for enabling user control over functionality and use of the one or more functions by the host application.

The one or more functions may include one or more evaluators and control logic for selective manipulation of an animation rig within the host application.

The one or more functions may include a scaling function to selectively scale a rendered object. The one or more functions may further include a rotation function to selectively rotate a rendered object, and/or a translation function to selectively translate a rendered object.

The one or modules may further include a module that is limited to receiving one or more fixed-length variables.

The example method may further including converting variable length data types to be input into the one or more modules into fixed-length data types in advance of providing the data types as input arguments into the one or more modules.

The example method may further specify that the one or more modules are implemented via one or more flat files in the portion of contiguous memory. The one or more modules may include a hierarchy of modules.

The one or more modules may include integration software for facilitating use of functionality provided by the one or more modules. The integration software may include a compiler enabling Just-In-Time (JIT) compilation of one or more processes for use by the host application. The compiler may be (and/or include) a C++ compiler.

Another example method includes the following steps: receiving a command to execute the evaluation logic to manipulate the animation control rig, wherein the evaluation logic includes at least two data structures that would be stored noncontiguously in one or more memories; modifying a storing of at least one of the two data structures so that the two data structures are selectively stored in cache memory to reduce data access time to within a time reduction threshold (as may vary depending upon application-specific implementations); storing the data structures in association with a computing object that implements at least a portion of the evaluation logic; integrating one or more modules associated with the computing object with one or more host applications, wherein the one or more host applications includes an animation software package; and implementing the evaluation logic by executing the computing object using the two data structures in approximately contiguous memory, and the animation software package, to cause an animation of the animation control rig.

The step of modifying may further include modifying a storing of at least one of the two data structures so that the two data structures are stored in minimal (or close) proximity in cache address memory (e.g., cache memory identified by a particular memory address) that is within a proximity threshold (e.g., a spatial or temporal threshold as measured my memory-location address distances as a function of memory location and/or time to access the memory location), whereby the data structures exhibit increased cache locality relative to initial storage locations.

The two data structures may include skeleton data associated with an animation control rig, wherein the skeleton data is represented by, or characterized by, the two data structures, which include one or more transform matrices.

The two data structures may include skeleton data associated with multiple animation control rigs or puppets associated with a particular scene.

The skeleton data may be represented by the two data structures, which may include one or more transform matrices.

The one or more modules may include one or more functions that are usable by the host application. The one or more functions may include a function to perform one or more kinematics or inverse kinematics operations, whereby one or more inputs to the function include position or orientation of one or more features of an animation control rig.

The example method may further include providing a UI widget with one or more UI controls for enabling user control over functionality and use of the one or more functions by the host application. The one or more functions may include one or more evaluators and control logic for selective manipulation of an animation rig within the host application. The one or more functions include a scaling function, translation function, rotation function, and/or other function to selectively adjust or manipulate a rendered object.

Figure 12:
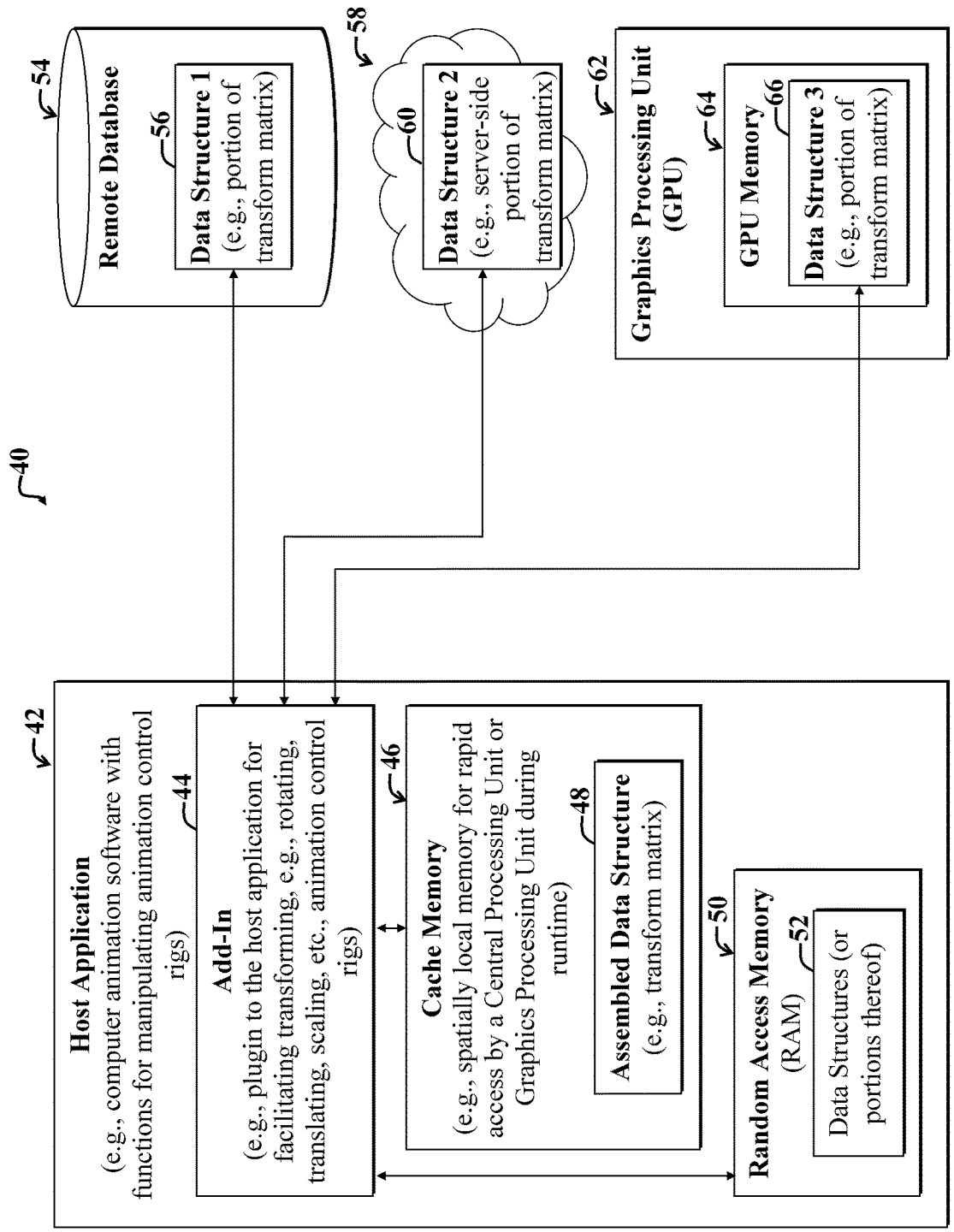

FIG. 12 illustrates an example computing environment 40 that includes an add-in (also called a plugin) 44 to a host application 42. The add-in 44 includes or leverages functionality for retrieving, collecting, and organizing data structures 56, 60, 66 or selected portions thereof, in local cache memory 46, thereby facilitating fast access to the data by functionality of the add-in 44.

For instance, the add-in 44 may leverage an interpreter, middleware, and other integration functionality to facilitate interfacing the add-in 44 with the host application 42; for communicating with remote computing resources 54-66; organizing data structures (e.g., an assembled data structure 48) in cache memory 46, and so on.

In the present implementation, the host application 42 represents a computer animation software package that incorporates functionality for manipulating animation control rigs. The add-in 44 also provides processes, e.g., functions or evaluators, for manipulating, e.g., transforming animation control rigs. Example processes include translating, scaling, rotating, skinning, and so on.

These processes use and/or otherwise operate on data pertaining to the animation control rig and/or associated scene. The data may represent, for instance, a transformation matrix or portion thereof. This data may be stored in data structures, which may be local (e.g., stored on the same computer as used to run the host application 42) or remote. Examples of remote data structures include first data structure 56 stored on a remote database 54. The remote database 54 may be maintained, for instance, on a Solid-State Drive (SSD).

A second example data structure 60 represents a cloud-based data structure on a cloud 58. The cloud 58 may include one or more servers that the client-side add-in 44 may communicate with, so as to retrieve data of the second data structure 60 or portion thereof, for use by one or more processes of the add-in 44 and/or host application 42.

A third example data structure 66 is stored in a Graphics Processing Unit (GPU) memory 64 of a GPU 62.

In operation, the add-in 44 selectively searches for and retrieves data, e.g., transformation matrices of the data structures 56, 60, 66 for use by a particular function or evaluator, e.g., a transformation function used to manipulate an animation control rig. The data structures 565, 60, 66, or selected portions thereof, are retrieved by the add-in 44; then temporarily stored in local Random Access Memory 50, as represented by data structures 52.

During execution of a particular function or evaluator, the add-in 44 ensures that data structures 52 from the RAM 50 are optimally retrieved from RAM 50 and assembled in cache memory 46, as represented by an assembled data structure 48. Note that all or portions of the assembled data structure 48 may be stored in contiguous or approximately contiguous memory blocks in the cache memory 46 and/or in RAM 50. This results in rapid access, by functions of the add-in 44, to data of the assembled data structure 48. This may greatly improve processing speeds when using the add-in 44 to manipulate animation control rigs.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain implementations require at least one of A, at least one of B and at least one of C each to be present.

The use of any and all examples, or exemplary language (e.g., "such as") provided herein, is intended merely to better illuminate implementations of the invention and does not pose a limitation on the scope of the invention unless otherwise claimed. No language in the specification should be construed as indicating any non-claimed element as essential to the practice of the invention.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further implementations can be envisioned to one of ordinary skill in the art after reading this disclosure. In other implementations, combinations or sub-combinations of the above-disclosed invention can be advantageously made. The example arrangements of components are shown for purposes of illustration and it should be understood that combinations, additions, re-arrangements, and the like are contemplated in alternative implementations of the present invention. Thus, while the invention has been described with respect to exemplary implementations, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for implementing evaluation logic associated with an animation control rig, the method comprising:
   receiving a command to execute the evaluation logic to manipulate the animation control rig, wherein the evaluation logic includes at least two data structures that would be stored noncontiguously in one or more memories;
   modifying a storing of at least one of the two data structures so that the two data structures are selectively stored in cache memory to reduce data access time to within a time reduction threshold;
   storing the data structures in association with a computing object that implements at least a portion of the evaluation logic;
   integrating one or more modules associated with the computing object with one or more host applications, wherein:
      the one or more host applications includes an animation software package;
      the one or more modules include one or more functions usable via one of the one or more host applications; and
      the one or modules include a module that is limited to receiving one or more fixed-length variables; and
   implementing the evaluation logic by executing the computing object using the two data structures in cache memory, and the animation software package, to cause an animation of the animation control rig.

2. The computer-implemented method of claim 1, wherein modifying a storing includes modifying a storing of at least one of the two data structures so that the two data structures are stored in close proximity in cache address memory that is within a proximity threshold, whereby the data structures exhibit increased cache locality relative to initial storage locations.

3. The computer-implemented method of claim 1, wherein the two data structures include skeleton data associated with an animation control rig, wherein the skeleton data is represented by the two data structures, which include one or more transform matrices.

4. The computer-implemented method of claim 3, wherein the two data structures include skeleton data associated with multiple animation control rigs associated with a particular scene.

5. The computer-implemented method of claim 1, wherein the skeleton data is represented by the two data structures, which include one or more transform matrices.

6. The computer-implemented method of claim 1, wherein the one or more functions include a function to perform one or more kinematics or inverse kinematics operations, whereby one or more inputs to the function include position or orientation of one or more features of an animation control rig.

7. The computer-implemented method of claim 1, further including providing a UI widget with one or more UI controls for enabling user control over functionality and use of the one or more functions by the host application.

8. The computer-implemented method of claim 1, wherein the one or more functions include one or more evaluators and control logic for selective manipulation of an animation rig within the host application.

9. The computer-implemented method of claim 1, wherein the one or more functions include a scaling function to selectively scale a rendered object.

10. The computer-implemented method of claim 1, wherein the one or more functions include a rotation function to selectively rotate a rendered object.

11. The computer-implemented method of claim 1, wherein the one or more functions include a translation function to selectively translate a rendered object.

12. The computer-implemented method of claim 1, further including converting variable length data types to be input into the one or more modules into fixed-length data types in advance of providing the data types as input arguments into the one or more modules.

13. The computer-implemented method of claim 1, wherein the one or more modules are implemented via one or more flat files in the portion of contiguous memory.

14. The computer-implemented method of claim 13, wherein the one or more modules includes a hierarchy of modules.

15. The computer-implemented method of claim 14, wherein the one or more modules includes integration software for facilitating use of functionality provided by the one or more modules.

16. The computer-implemented method of claim 15, wherein the integration software includes a compiler enabling Just-In-Time (JIT) compilation of one or more processes for use by the host application.

17. The computer-implemented method of claim 16 wherein the compiler includes a C++ compiler.

18. The computer-implemented method of claim 1, further including using the one or more modules to expose user versioning control of modules via the one or more host applications.

19. The computer-implemented method of claim 18, further including using an Application Programming Interface (API) to expose functionality of the one or more modules to the one or more host applications.

20. The computer-implemented method of claim 1, further including selectively restricting connecting one or more Graphics Processing Unit (GPU) variables with a function running on a Central Processing Unit (CPU).

* * * * *